United States Patent
Raikwar (10) Patent No.: US 8,555,026 B2
(45) Date of Patent: Oct. 8, 2013

(54) METHODS AND SYSTEMS FOR STORING VARIABLE WIDTH STACK ELEMENTS IN A SINGLE MEMORY STACK

(75) Inventor: Avinash Kant Raikwar, Bangalore (IN)

(73) Assignee: LSI Corporation, San Jose, CA (US)

( * ) Notice: Subject to any disclaimer, the term of this patent is extended or adjusted under 35 U.S.C. 154(b) by 244 days.

(21) Appl. No.: 12/876,169

(22) Filed: Sep. 6, 2010

(65) Prior Publication Data

US 2012/0059999 A1    Mar. 8, 2012

(51) Int. Cl.
*G06F 12/00* (2006.01)
*G06F 13/00* (2006.01)
*G06F 13/28* (2006.01)

(52) U.S. Cl.
USPC .......................................... 711/171; 711/154

(58) Field of Classification Search
USPC ................................. 711/154, 171
See application file for complete search history.

(56) References Cited

U.S. PATENT DOCUMENTS

| | | | |
|---|---|---|---|
| 5,802,598 A | 9/1998 | Watt | |
| 5,946,000 A | 8/1999 | Hoel | |
| 5,974,516 A * | 10/1999 | Qureshi | 711/171 |
| 6,871,256 B2 | 3/2005 | Drescher et al. | |
| 7,139,877 B2 | 11/2006 | Hooker | |
| 7,203,820 B2 | 4/2007 | Damron | |
| 7,257,665 B2 * | 8/2007 | Niell et al. | 711/101 |
| 7,302,550 B1 * | 11/2007 | Merck | 712/202 |
| 7,548,848 B1 | 6/2009 | Deb et al. | |
| 7,551,636 B2 | 6/2009 | Morrison | |
| 2002/0078317 A1 * | 6/2002 | Yasoshima | 711/171 |
| 2004/0168124 A1 * | 8/2004 | Beisiegel et al. | 715/513 |

* cited by examiner

*Primary Examiner* — Matthew Bradley
*Assistant Examiner* — Rocio Del Mar Perez-Velez
(74) *Attorney, Agent, or Firm* — Mendelsohn, Drucker & Dunleavy, P.C.; Steve Mendelsohn (57) ABSTRACT

A system and method for storing variable width stack elements in a single memory stack is disclosed. In one example embodiment a first variable width stack element is split into one or more sub-elements. The width of the sub-elements may be less than or equal to a width of the single memory stack. A first memory pointer is created for providing an address of a first read pointer in the single memory stack. The first read pointer may provide an address corresponding to a first sub-element of the first variable width stack element. The first sub-element is written in a first available location in the single memory stack. A write pointer of the single memory stack is incremented when the first sub-element is written to the first available location on the single memory stack. The steps of writing and incrementing are repeated for a next sub-element until all of the sub-elements are stored in the single memory stack.

25 Claims, 6 Drawing Sheets

METHODS AND SYSTEMS FOR STORING VARIABLE WIDTH STACK ELEMENTS IN A SINGLE MEMORY STACK

BACKGROUND

Developments in the field of digital signal processors have led to an increased interest in parallel data processing. In the parallel processing of a data processing program the necessity arises, for example, for storing local variables of procedures. Particularly in recursive procedures, holding each variable on an absolute memory address may not be possible, as a second retrieval of the procedure would overwrite the first variable values deposited there. The procedures are a specified series of actions of operations which have to be executed in same manner in order to obtain a similar result under similar circumstances. The specified series of actions of operations are also referred to as elements of the procedure. For this reason, a special memory area, which is designated as a stack and works as LIFO (last in first out) memory, is usually created for storing local variables.

In the LIFO memory, the last element stored is a first element to be retrieved. As an example in markup languages (i.e., XML, HTML), during processing, an element is first opened and then it is closed. Any number of elements may be opened within the elements. To open and/or to close an element, the name of the element is required. The name of the element if stored in a stack, for opening the element may be retrieved when an element close indication is received. In such instances, there is no need to store the complete name along with XML for closing elements. Typically the names of the elements are of variable width. Generally a memory stack having a width more than or equal to the width of the longest element name is selected for storing the elements. This scheme of storing element names results in wastage of the memory space in the stack as most of the element names do not occupy the entire width.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for storing variable width stack elements in a single memory stack is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
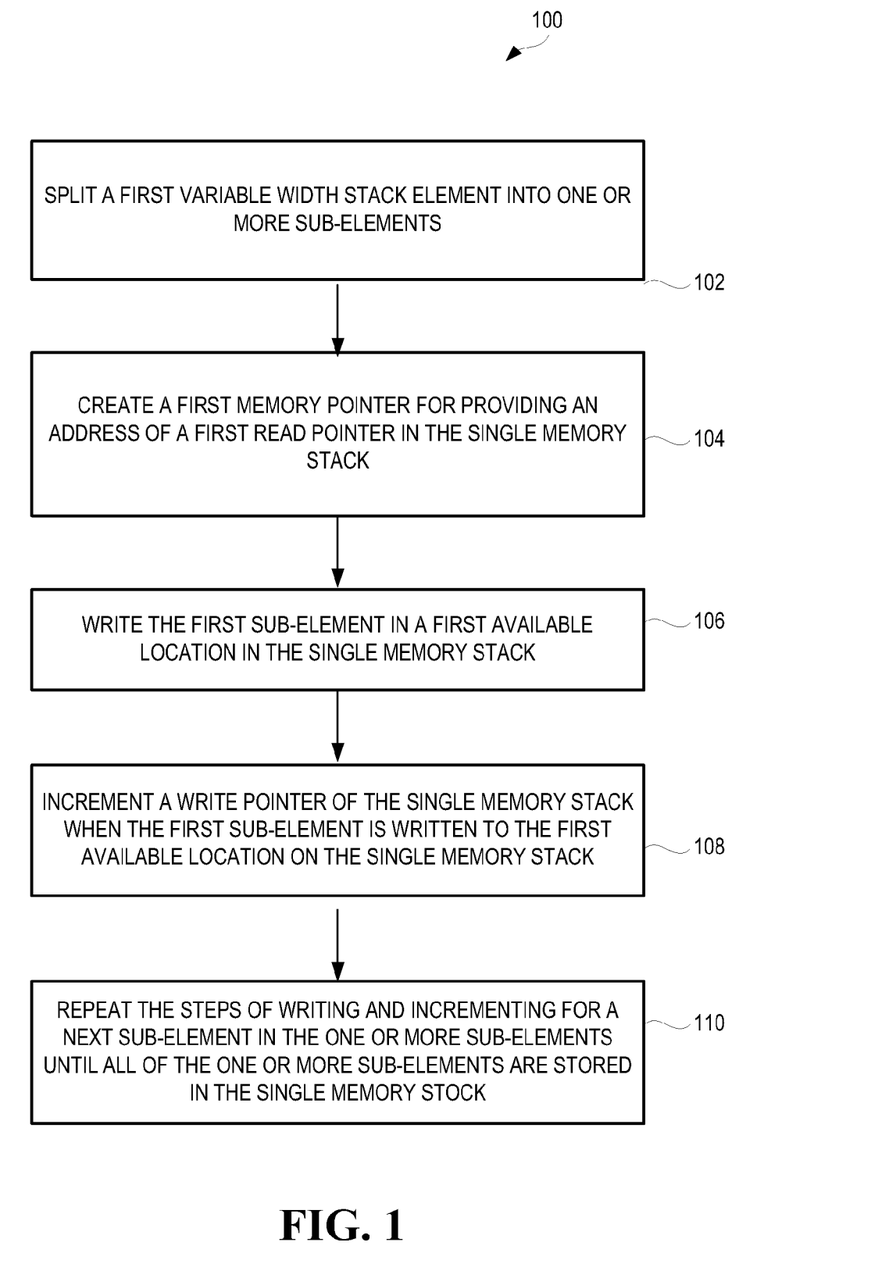
FIG. 1 illustrates a flow diagram of an exemplary method for storing variable width stack elements in the single memory stack.
Figure 3A:
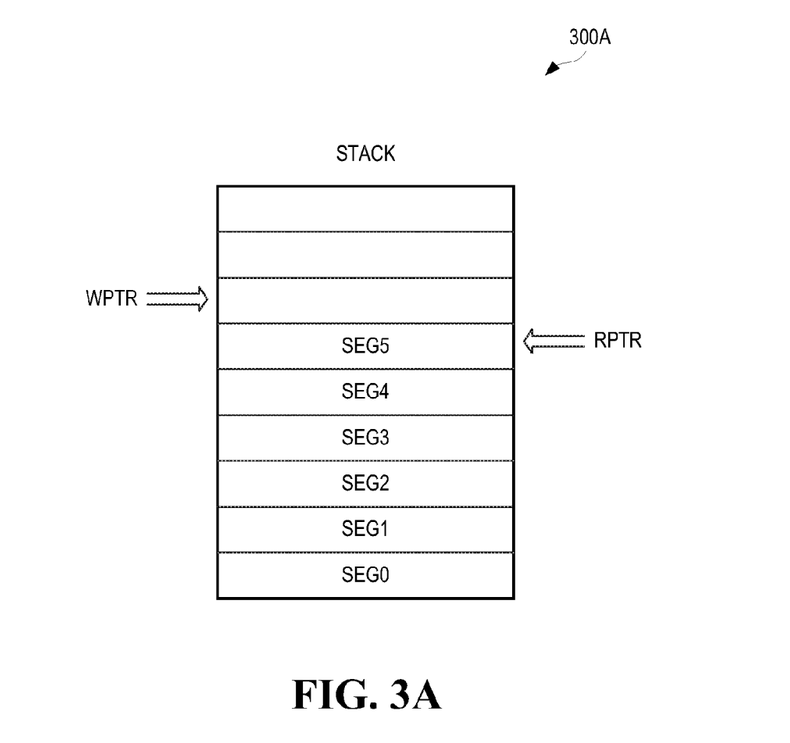
FIG. 3A illustrates the single memory stack depicting fixed length elements stored in the memory stack, in a context of the present disclosure.
Figure 3B:
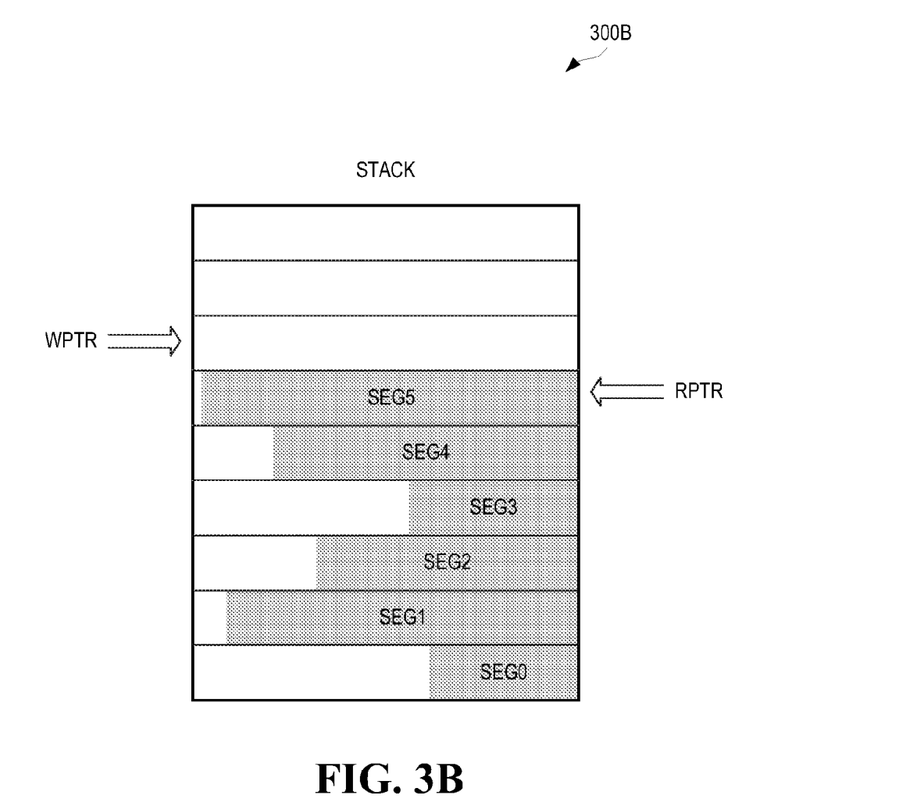
FIG. 3B illustrates the single memory stack depicting segments of variable length stored in the memory stack in a context of the present disclosure.
Figure 4:
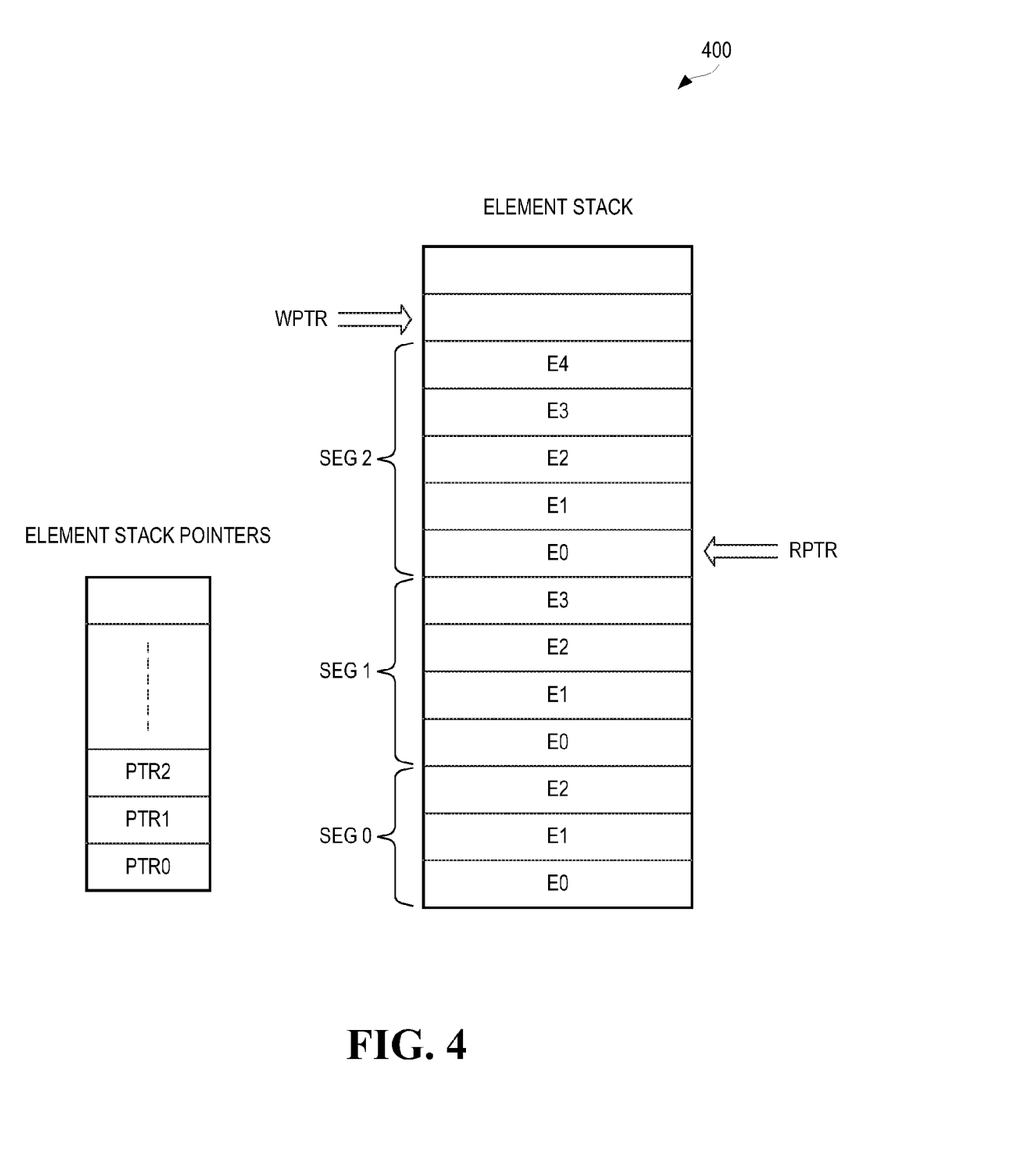
FIG. 4 illustrates the single memory stack depicting sub-elements of variable length elements stored, according to an embodiment.

FIG. 1 illustrates a flow diagram 100 of an exemplary method for storing variable width stack elements in a single memory stack, according to an embodiment. The single memory stack is generally a LIFO buffer. FIGS. 3A, 3B and 4 illustrate examples of the LIFO buffer. The variable width stack elements may be XML and/or HTML elements. However, the present disclosure is not limited to XML and/or HTML elements and may be employed in various other applications. The present disclosure may enable implementation of a first in first out (FIFO) within a LIFO memory stack.

At block 102, a first variable width stack element is split into one or more sub-elements, upon receiving a write request for storing the first variable width stack element in the single memory stack. The request for storing the first variable width stack element may be received from a procedure, for storing local variables of the procedure on the single memory stack. For example in FIG. 4 the first variable width stack element SEG0 is split into three sub-elements E0, E1 and E2.

According to an embodiment, the first variable width stack element is split into the one or more sub elements by determining the width of the single memory stack, determining a width of the first variable width stack element, and splitting the first variable width stack element into the one or more sub-elements of a size less than or equal the width of the single memory stack. The size of a last sub-element of the one or more sub elements may be less than the width of the single memory stack. The last sub-element may need padding.

At block 104, a first memory pointer is created. The first memory pointer may provide an address of a first read pointer in the single memory stack. The first memory pointer may be stored in a different single memory stack. The first read pointer in the single memory stack may provide an address of a first sub-element of the first variable width stack element.

At block 106, the first sub element of the first variable width stack element is written in the single memory stack. The first sub element may be written on a first available location on the single memory stack. The first available location in the single memory stack may be determined by reading a write pointer of the single memory stack. The write pointer of the single memory stack provides an address of the first available location for storing data in the single memory stack.

At block 108, the write pointer of the single memory stack is incremented. The write pointer is incremented by one block after writing one sub element of the first variable width stack element.

At block 110, the steps of writing and incrementing are repeated for the next sub-element of the first variable width stack element. The steps of writing and incrementing are repeated until all the sub elements of the first variable width stack element are written into the single memory stack element. According to an embodiment, when all the sub-elements of the first variable width stack element are stored in the single memory stack, a second variable width stack element may be received for storing in the single memory stack. For storing the second variable width stack element the steps of splitting, creating and writing are repeated until all the sub-elements of the second variable width stack element are stored in the single memory stack.

Figure 2:
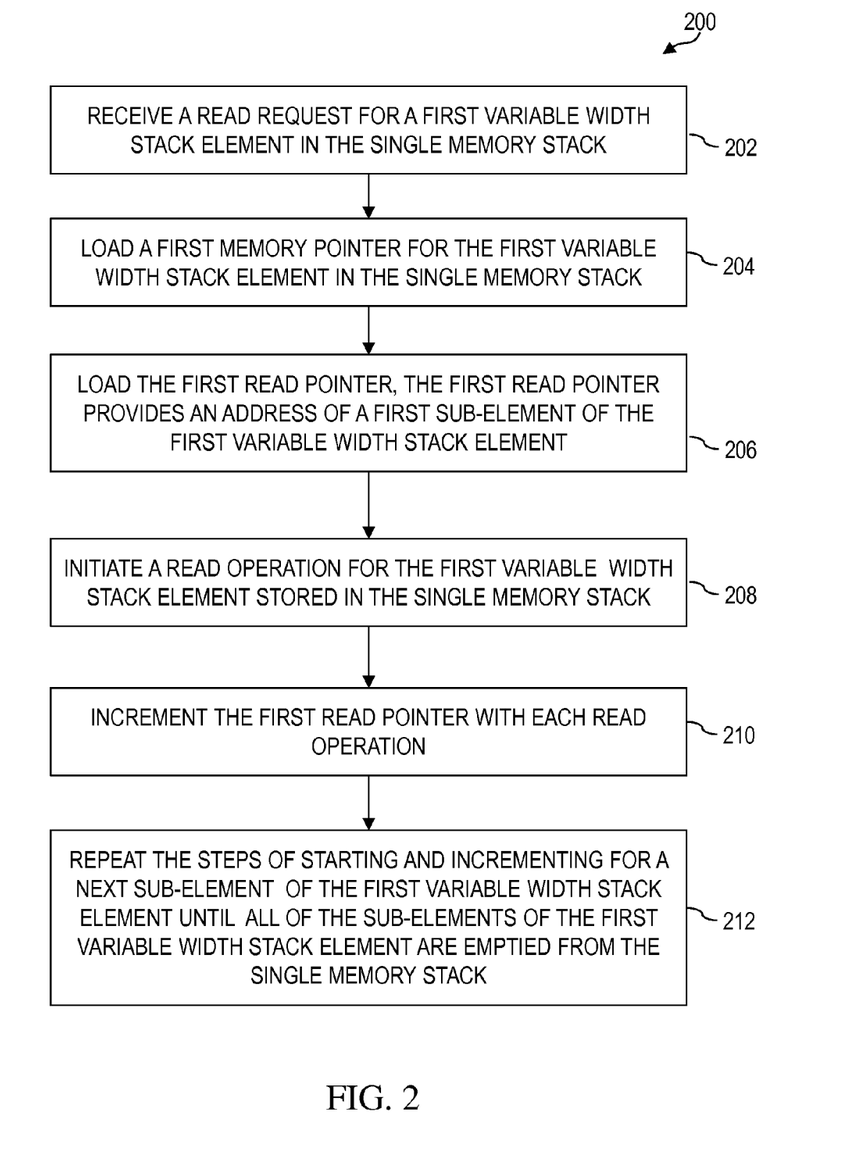
FIG. 2 illustrates a flow diagram of an exemplary method for reading variable width stack elements in the single memory stack.

FIG. 2 illustrates a flow diagram of an exemplary method for reading variable width stack elements from the single memory stack. During the read operation in the single memory stack, the variable width stack elements may be returned in the LIFO order, i.e., the last element stored is retrieved first. According to an embodiment, however the sub-elements of the variable width stack elements need to be returned in a first in first out (FIFO) order so that the variable width stack elements may be understood and processed accordingly. This is accomplished by storing the memory pointers for each of the variable width stack element, which provides an address of the read pointers for the first sub-element of the variable width stack element in the single memory stack.

At block 202, a read request for a first variable width stack element in the single memory stack may be received. The read request may be received from a procedure. According to an embodiment, the read request may start only with the last variable width stack element stored in the single memory stack. For example in FIG. 4, the reading can only be initiated with SEG 2. According to another embodiment, when there is only one variable width stack element stored in the single memory stack, the first, the second and the third variable width stack elements represent the same one variable width stack element stored in the single memory stack.

At block 204, a first memory pointer for the first variable width stack element is loaded in the single memory stack. The first memory pointer may provide an address of the first a read pointer in the single memory stack. For example in FIG. 4, for reading the SEG2, the PTR2 will be loaded.

At block 206, the first read pointer is loaded. An address of the first read pointer may be received from the first memory pointer. The first read pointer provides an address of the first sub-element of the first variable width stack element. For example in FIG. 4, the read pointer RPTR will be loaded. The address of the RPTR is provided by the first memory pointer PTR1. The read pointer RPTR provides an address of the first sub-element E0 of the first variable width stack element SEG2.

At block 208, the read operation is initiated for the first variable width stack element stored in the single memory stack. During a read operation the variable width stack elements are popped out of the single memory stack. For example in FIG. 4, the sub-element E0 of the first variable width stack element SEG2 will be popped out of the single memory stack.

At block 210, the first read pointer may be incremented with each read operation. The first read pointer after being incremented may provide an address of the second sub-element of the first variable width stack element. For example in FIG. 4, the first read pointer RPTR may be incremented to provide an address of a second sub element E1 of the first variable width stack element SEG 2.

At block 212, the step of starting of block 208 and the step of incrementing at block 210 are repeated for a next sub-element of the first variable width stack element. The step of starting of block 208 and the step of incrementing at block 210 may be repeated until all the sub-elements of the first variable width stack elements are popped out from the single memory stack. For example in FIG. 4, the step of starting of block 208 and the step of incrementing at block 210 are repeated until sub-elements E0, E1, E2 and E3 of the variable width stack element SEG2 are popped out from the single memory stack.

According to an embodiment, a write pointer WPTR may be decremented with each read operation. The WPTR may be aligned appropriately for a next segment write operation at the end of the segment read operation. The write pointer WPTR may be stored in a buffer memory to compare and generate a single memory stack empty operation.

According to an embodiment, a read request for a next variable width stack element stored in the single memory stack may be received. For the next variable width stack element the above steps of loading a next memory pointer at block 204, loading a next read pointer at block 206, initiating a read operation at block 208, incrementing at block 210 and repeating at block 212 will be repeated until all the sub-elements of the next variable width stack elements are popped out from the single memory stack. For example in FIG. 4, after all the sub-elements of first variable width stack element SEG2 are popped out, a request may be received for reading the next variable width stack element SEG1.

FIG. 3A illustrates the single memory stack 300A depicting elements stored in the memory stack, in a context of the present disclosure. The single memory stack 300A includes a plurality of data locations. The single memory stack 300A further includes a plurality of stack elements stored in the data locations. The plurality of stack elements in the memory stack 300A are represented by SEG0, SEG1, SEG2, SEG3, SEG4 and SEG5. The first available stack element is pointed in the single memory stack by a read pointer RPTR. The first available location for writing a next stack element in the single memory stack is pointed by the write pointer WPTR.

FIG. 3B illustrates the single memory stack 300B depicting segments of variable length stored in the memory stack in a context of the present disclosure. The single memory stack 300B includes a plurality of stack elements stored in the data locations. The plurality of stack elements in the memory stack 300B are represented by SEG0, SEG1, SEG2, SEG3, SEG4 and SEG5. The first available element in the single memory stack 300B is pointed by a read pointer RPTR. The first available location for writing a next element in the single memory stack 300B is pointed by the write pointer WPTR. The shaded area in the single memory stack 300B depicts the space occupied by the data elements and the white space in the single memory stack depicts the unused space.

FIG. 4 illustrates the single memory stack 400 depicting sub-elements of variable length elements stored, according to an embodiment. FIG. 4 illustrates three variable width stack elements SEG0, SEG1 and SEG2 stored in the single memory stack. E0, E1 and E2 are sub-elements of variable width stack element SEG0. E0, E1, E2 and E3 are sub-elements of variable width stack element SEG1. E0, E1, E2, E3 and E4 are sub-elements of variable width stack element SEG2. PTR0, PTR1 and PTR2 represent the memory pointer corresponding to variable width stack elements SEG0, SEG1 and SEG2 respectively. The memory pointers PTR0, PTR1 and PTR2 provide address for the first sub-elements of the variable width stack elements SEG0, SEG1 and SEG2 respectively. The memory pointers PTR0, PTR1 and PTR2 may be stored in a separate single memory stack. The write pointer for the single memory stack is represented as WPTR and read pointer for the single memory stack is represented by RPTR.

Figure 5:
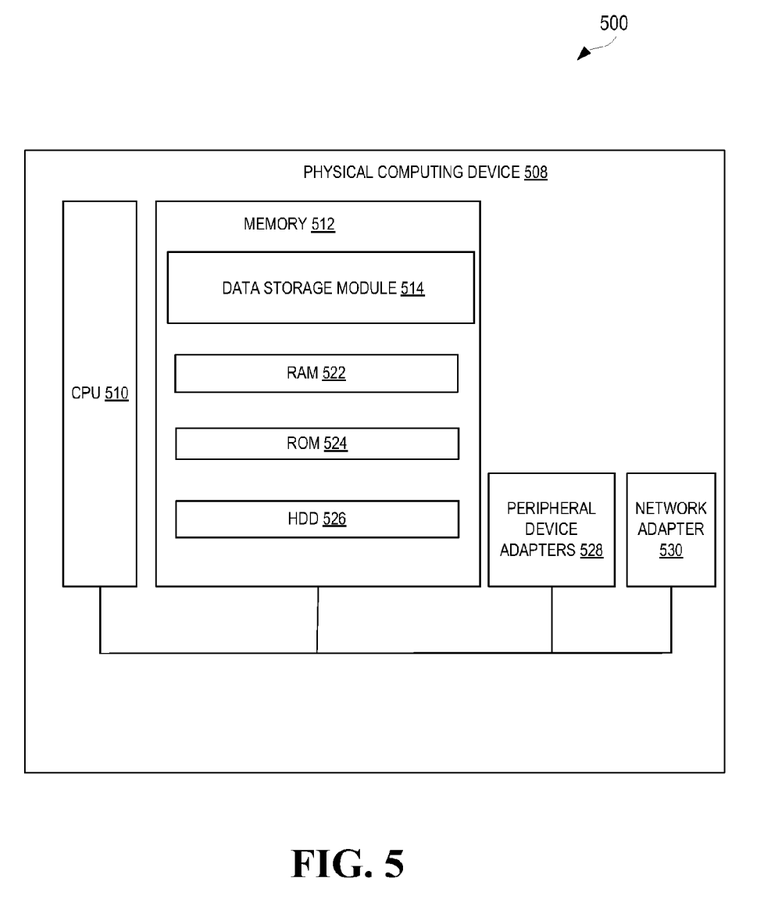
FIG. 5 illustrates a block diagram of a system for storing variable width stack elements in the single memory stack, according to one embodiment.

FIG. 5 illustrates a block diagram (500) of a system for storing a variable width stack element in a single memory stack using a data storage module (514), according to one embodiment. Referring now to FIG. 5, an illustrative system (500) for storing variable width stack elements includes a physical computing device (508). The physical computing device (508) of the present example is a computing device configured to store a variable width stack element in the single memory stack by splitting the variable width stack element into one or more sub-elements. Illustrative processes of storing the variable width stack element in the single memory stack will be set forth in more detail below.

To achieve its desired functionality, the physical computing device (508) includes various hardware components. Among these hardware components may be at least one processing unit (510), at least one memory unit (512) and peripheral device adapters (528), and a network adapter (530). These hardware components may be interconnected through the use of one or more busses and/or network connections.

The processing unit (510) may include the hardware architecture necessary to retrieve executable code from the memory unit (512) and execute the executable code. The executable code may, when executed by the processing unit (510), cause the processing unit (510) to implement at least the functionality of storing the variable width stack element in the single memory stack. In the course of executing code, the processing unit (510) may receive input from and provide output to one or more of the remaining hardware units.

The memory unit (512) may be configured to digitally store data consumed and produced by the processing unit (510). Further, the memory unit (512) includes the data storage module (514). The memory unit (512) may also include various types of memory modules, including volatile and non-volatile memory. For example, the memory unit (512) of the present example includes Random Access Memory (RAM) (522), Read Only Memory (ROM) (524), and Hard Disk Drive (HDD) memory (526). Many other types of memory are available in the art, and the present specification contemplates the use of any type(s) of memory in the memory unit (512) as may suit a particular application of the principles described herein. In certain examples, different types of memory in the memory unit (512) may be used for different data storage needs. For example, in certain embodiments the processing unit (510) may boot from ROM, maintain non-volatile storage in the HDD memory, and execute program code stored in RAM.

The hardware adapters (e.g., the peripheral device adapters (528) and the network adapter (530)) in the physical computing device (508) are configured to enable the processing unit (510) to interface with various other hardware elements, external and internal to the physical computing device (508). For example, peripheral device adapters (528) may provide an interface to input/output devices to create a user interface and/or access external sources of memory storage. Peripheral device adapters (528) may also create an interface between the processing unit (510) and a printer or other media output device.

The above described embodiments with respect to FIG. 5 are intended to provide a brief, general description of the suitable computing environment (500) in which certain embodiments of the inventive concepts contained herein may be implemented.

As shown, the computer program includes the data storage module (514) for storing the variable width stack element in a single memory stack. For example, the data storage module (514) described above may be in the form of instructions stored on a non-transitory computer-readable storage medium. An article includes the non-transitory computer-readable storage medium having the instructions that, when executed by the physical computing device (508), causes the computing device (508) to perform the one or more methods described in FIGS. 1-4.

In various embodiments, the methods and systems described in FIGS. 1 through 5 is easy to implement using the above mentioned method. According to an embodiment, the methods described in FIGS. 1 through 5 provide a mechanism to keep a depth of the single memory stack variable. The methods described in FIGS. 1 through 5 also provide a mechanism to utilize a maximum space in the single memory stack. Furthermore the methods described in FIGS. 1 through 5 provide a mechanism to access a number of FIFO's available within a LIFO single memory stack and a framework to implement multiple FIFO's of variable depths in the single memory stack.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of storing variable width stack elements in a single, two-dimensional, last-in, first-out memory stack having a number of multi-bit rows of uniform row width, wherein (i) height of the two-dimensional memory stack is the number of rows, each different row along the height of the memory stack having a different address value, and (ii) width of the two-dimensional memory stack is the uniform row width, comprising:
   splitting a first variable width stack element into two or more sub-elements, (i) the first variable width stack element having a width greater than the uniform row width of the two-dimensional memory stack and (ii) each sub-element having a width less than or equal to the uniform row width of the single memory stack upon receiving a write request;
   creating a first memory pointer for providing an address of a first read pointer in the single memory stack, the first read pointer providing an address corresponding to a first sub-element of the first variable width stack element;
   writing the first sub-element in a first available row in the single memory stack;
   incrementing a write pointer of the single memory stack when the first sub-element is written to the first available row on the single memory stack; and
   repeating the steps of writing and incrementing for a next sub-element in the two or more sub-elements until each of the two or more sub-elements is stored in a different row along the height of the single memory stack.

2. The method of claim 1, wherein splitting the first variable width stack element into the two or more sub-elements comprises:
   determining the uniform row width of the single memory stack;
   determining the width of the first variable width stack element; and
   splitting the first variable width stack element into the two or more sub-elements of a width less than or equal to the uniform row width of the single memory stack.

3. The method of claim 1, further comprising:
   receiving a second variable width stack element for storing into the single memory stack; and repeating the steps of splitting, creating, writing and incrementing until all of two or more sub-elements of the second variable width stack element are stored in the single memory stack.

4. The method of claim 1, further comprising:
receiving a read request for the first variable width stack element in the single memory stack;
loading the first memory pointer for the first variable width stack element in the single memory stack, wherein the first memory pointer provides the address of the first read pointer of the single memory stack;
loading the first read pointer, wherein the first read pointer provides the address of the first sub-element of the first variable width stack element;
starting a read operation for the first variable width stack element stored in the single memory stack;
incrementing the first read pointer with each read operation; and
repeating the steps of starting and incrementing for the next sub-element of the first variable width stack element until all of two or more sub-elements of the first variable width stack element are emptied from the single memory stack in first-in, first-out order.

5. The method of claim 4, further comprising:
storing the write pointer in a buffer memory and comparing the write pointer to the first read pointer to generate an empty operation.

6. The method of claim 4, further comprising:
decrementing the write pointer for each of the read operation.

7. The method of claim 4, wherein the first memory pointer is a last memory pointer.

8. The method of claim 1, wherein the first variable width stack element is an XML element.

9. A system for storing variable width stack elements in a single, two-dimensional, last-in, first-out memory stack having a number of multi-bit rows of uniform row width, wherein (i) height of the two-dimensional memory stack is the number of rows, each different row along the height of the memory stack having a different address value, and (ii) width of the two-dimensional memory stack is the uniform row width, comprising:
a processor; and
a memory operatively coupled to the processor, wherein the memory includes a data storage module for storing the variable width stack elements in the single memory stack, having instructions capable of:
splitting a first variable width stack element into two or more sub-elements, (i) the first variable width stack element having a width greater than the uniform row width of the two-dimensional memory stack and (ii) each sub-element having a width less than or equal to the uniform row width of the single memory stack upon receiving a write request;
creating a first memory pointer for providing an address of a first read pointer in the single memory stack, the first read pointer providing an address corresponding to a first sub-element of the first variable width stack element;
writing the first sub-element in a first available row in the single memory stack;
incrementing a write pointer of the single memory stack when the first sub-element is written to the first available row on the single memory stack; and
repeating the steps of writing and incrementing for a next sub-element in the two or more sub-elements until each of the two or more sub-elements is stored in a different row along the height of the single memory stack.

10. The system of claim 9, wherein splitting the first variable width stack element into the two or more sub-elements comprises:
determining the uniform row width of the single memory stack;
determining the width of the first variable width stack element; and
splitting the first variable width stack element into the two or more sub-elements of a width less than or equal the uniform row width of the single memory stack.

11. The system of claim 9, wherein the data storage module further includes instructions capable of:
receiving a second variable width stack element for storing into the single memory stack; and
repeating the steps of splitting, creating, writing and incrementing until all of two or more sub-elements of the second variable width stack element are stored in the single memory stack.

12. The system of claim 9, wherein the data storage module further includes instructions capable of:
receiving a read request for the first variable width stack element in the single memory stack;
loading the first memory pointer for the first variable width stack element in the single memory stack, wherein the first memory pointer provides the address of the first read pointer of the single memory stack;
loading the first read pointer wherein the first read pointer provides the address of the first sub-element of the first variable width stack element;
starting a read operation for the first variable width stack element stored in the single memory stack;
incrementing the first read pointer with each read operation; and
repeating the steps of starting and incrementing for the next sub-element of the first variable width stack element until all of two or more sub-elements of the first variable width stack element are emptied from the single memory stack in first-in, first-out order.

13. The system of claim 12, wherein the data storage module further comprises instructions capable of:
storing the write pointer in a buffer memory and comparing the write pointer to the first read pointer to generate an empty operation.

14. The system of claim 12, wherein the first memory pointer is a last memory pointer.

15. The system of claim 9, wherein the first variable width stack element is an XML element.

16. The invention of claim 9, wherein the processor is configured to always store multiple, variable width stack elements into the memory stack in sequence.

17. A non-transitory computer-readable storage medium for storing variable width stack elements in a single, two-dimensional, last-in, first-out memory stack having a number of multi-bit rows of uniform row width, wherein (i) height of the two-dimensional memory stack is the number of rows, each different row along the height of the memory stack having a different address value, and (ii) width of the two-dimensional memory stack is the uniform row width, having instructions that, when executed by a computing device, causes the computing device to perform a method comprising:
splitting a first variable width stack element into two or more sub-elements, (i) the first variable width stack element having a width greater than the uniform row width of the two-dimensional memory stack and (ii) each sub-element having a width less than or equal to the uniform row width of the single memory stack upon receiving a write request;

creating a first memory pointer for providing an address of a first read pointer in the single memory stack, the first read pointer providing an address corresponding to a first sub-element of the first variable width stack element;

writing the first sub-element in a first available row in the single memory stack;

incrementing a write pointer of the single memory stack when the first sub-element is written to the first available row on the single memory stack; and repeating the steps of writing and incrementing for a next sub-element in the two or more sub-elements until each of the two or more sub-elements is stored in a different row along the height of the single memory stack.

18. The non-transitory computer-readable storage medium of claim 17, further comprising instructions for:

receiving a read request for the first variable width stack element in the single memory stack;

loading the first memory pointer for the first variable width stack element in the single memory stack, wherein the first memory pointer provides the address of the first read pointer of the single memory stack;

loading the first read pointer wherein the first read pointer provides the address of the first sub-element of the first variable width stack element;

starting a read operation for the first variable width stack element stored in the single memory stack;

incrementing the first read pointer with each read operation; and repeating the steps of starting and incrementing for the next sub-element of the first variable width stack element until all of two or more sub-elements of the first variable width stack element are emptied from the single memory stack in first-in, first-out order.

19. The non-transitory computer-readable storage medium of claim 17, wherein splitting the first variable width stack element into the two or more sub-elements comprises:

determining the width of the single memory stack;

determining the width of the first variable width stack element; and splitting the first variable width stack element into the two or more sub-elements of a width less than or equal the width of the single memory stack.

20. An integrated circuit comprising:

a two-dimensional memory stack having a number of multi-bit rows of uniform row width, wherein (i) height of the two-dimensional memory stack is the number of rows and (ii) width of the two-dimensional memory stack is the uniform row width; and a processor configured to store multiple, variable width stack elements into the memory stack in last-in, first-out order, wherein the processor is configured to store a first stack element having a width wider than the uniform row width of the memory stack by:

(a) splitting the first stack element into two or more sub-elements, each having a width less than or equal to the uniform row width of the memory stack; and (b) storing each sub-element into a different location row along the height of the memory stack.

21. The invention of claim 20, wherein the processor is configured to read the two or more sub-elements of the first stack element out from the memory stack in first-in, first-out order.

22. The invention of claim 20, wherein the processor is configured to read the two or more sub-elements of the first stack element out from the memory stack in the same order in which the processor stored the two or more sub-elements into the memory stack.

23. The invention of claim 20, wherein the processor is configured to always store the multiple, variable width stack elements into the memory stack in sequence.

24. The invention of claim 20, wherein the processor is configured to always store the multiple, variable width stack elements without skipping any rows.

25. The invention of claim 20, wherein the processor is configured to store stack elements of any width up to a maximum width equal to the product of the height and the uniform row width of the memory stack.

* * * * *

UNITED STATES PATENT AND TRADEMARK OFFICE
CERTIFICATE OF CORRECTION

| | | |
|---|---|---|
| PATENT NO. | : 8,555,026 B2 | Page 1 of 1 |
| APPLICATION NO. | : 12/876169 | |
| DATED | : October 8, 2013 | |
| INVENTOR(S) | : Avinash Kant Raikwar | |

It is certified that error appears in the above-identified patent and that said Letters Patent is hereby corrected as shown below:

In the Claims

In column 10, claim 20, line 20, delete the word "location"

Signed and Sealed this
Sixth Day of May, 2014

Michelle K. Lee
*Deputy Director of the United States Patent and Trademark Office*